United States Patent
Pawloski et al.

[11] Patent Number: 5,484,052
[45] Date of Patent: Jan. 16, 1996

[54] CARRIER PUCK

[75] Inventors: James C. Pawloski, Troy; Gary S. Bliss, Beavercreek; Ronald L. Siemon, Springfield, all of Ohio

[73] Assignee: Dowbrands L.P., Indianapolis, Ind.

[21] Appl. No.: 238,778

[22] Filed: May 6, 1994

[51] Int. Cl.⁶ ................................................ B65G 37/00
[52] U.S. Cl. ........................ 198/803.01; 198/803.11; 198/803.14
[58] Field of Search ................... 198/803.01, 803.7, 198/803.8, 803.9, 803.11, 803.14, 803.15

[56] References Cited

U.S. PATENT DOCUMENTS

| | | | |
|---|---|---|---|
| 2,223,846 | 12/1940 | Dostal | 198/803.15 X |
| 2,258,717 | 10/1941 | Read | 198/803.15 X |
| 2,936,059 | 5/1960 | Hakogi . | |
| 3,090,478 | 5/1963 | Stanley | 198/803.01 X |
| 3,150,765 | 9/1964 | Ellis | 198/803.15 X |
| 3,199,552 | 8/1965 | Nordfors | 198/803.8 X |
| 3,342,304 | 9/1967 | Greulich . | |
| 3,538,997 | 11/1970 | Christine et al. | 198/803.01 |
| 3,819,194 | 6/1974 | Grevich et al. . | |
| 3,941,237 | 3/1976 | MacGregor, Jr. . | |
| 4,114,511 | 9/1978 | Patenaude . | |
| 4,159,762 | 7/1979 | Bulwith | 198/803.01 |
| 4,263,837 | 4/1981 | Tassie . | |
| 4,518,076 | 5/1985 | Feisel et al. | 198/803.01 |
| 4,533,038 | 8/1985 | Richard . | |
| 4,684,012 | 8/1987 | Feddersen | 198/803.01 |
| 4,698,475 | 10/1987 | Lothenbach et al. | 198/803.01 X |
| 4,778,045 | 10/1988 | Grüne et al. | 198/803.01 |
| 4,799,846 | 1/1989 | Wissman et al. | 198/803.8 X |
| 4,807,421 | 2/1989 | Araki et al. . | |
| 4,819,789 | 4/1989 | Linnér | 198/803.8 |
| 4,909,022 | 3/1990 | Kubis et al. | 198/803.01 X |
| 4,936,442 | 6/1990 | Von Till | 198/803.01 |
| 5,183,368 | 2/1993 | Douard . | |
| 5,224,585 | 7/1993 | Blanco et al. | 198/803.01 |

FOREIGN PATENT DOCUMENTS

1059147  3/1954  France .

Primary Examiner—D. Glenn Dayoan

[57] ABSTRACT

A carrier puck is provided for receiving and supporting an article to be moved along a predetermined path. The carrier puck is made of a main body having an inner cavity for receiving the article. The puck also includes at least one gripper element extending from an inner side wall of the main body into the first cavity for engaging with a protruding ridge on the article to releasably hold and stabilize the article in the puck. The carrier puck may also include a second cavity having a size which differs from the size of the first cavity.

11 Claims, 6 Drawing Sheets

CARRIER PUCK

BACKGROUND OF THE INVENTION

The present invention relates to carrier pucks for receiving and supporting objects to be moved along a processing line and, more particularly, to carrier pucks capable of receiving and supporting one of at least first and second articles, each having different dimensions, and to carrier pucks having improved stabilizing capabilities.

Carrier pucks are common in the prior art. Such pucks are used to receive, support and stabilize articles to be moved along a processing line. Movement of the pucks and, hence, the articles, is effected via a conveyor. The conveyor may comprise a moving belt extending between opposing guide rails which act to maintain the pucks properly positioned on the moving belt.

U.S. Pat. No. 3,941,237 discloses a carrier puck having inner fins which act to hold an article within the puck. The puck is designed to receive an article having straight outer walls and a specific outer diameter. An article having a different contour, such as a bottle having outer curvilinear walls and an outer protruding ridge, will either not fit within the puck or if received will not be adequately supported and stabilized by the puck while moving along the processing line.

A further prior art carrier puck comprises a main body having inner side walls shaped to follow the contour of an article having generally straight outer walls. An article having non-straight walls will either not fit within the puck cavity or if received will not be properly supported by the puck while moving along the processing line.

Accordingly, these prior art carrier pucks are limited in their use since they can only adequately support and stabilize articles having one particular shape. When articles having a different shape are to be processed along the same processing line, new carrier pucks must be installed. This, however, is costly due to, inter alia, production line downtime and the expense of additional pucks.

Accordingly, there is a need for an improved carrier puck which is capable of receiving and supporting one of at least first and second articles, each having different dimensions. There is further a need for an improved carrier puck which is capable of receiving and supporting an article having walls which are not generally straight.

SUMMARY OF THE INVENTION

These needs are met by the present invention wherein a carrier puck is provided which is capable of receiving and supporting an article having walls which are not generally straight. Also provided is a carrier puck which is capable of receiving and supporting either of first and second articles, each having different dimensions. Both articles are held centrally within the puck and the upper end of each article is maintained at substantially the same height from the lower edge of the puck. Since the carrier puck of the present invention is capable of receiving either of two articles, each having different dimensions, the carrier puck substantially reduces production line downtime and eliminates expenses associated with acquiring additional carrier pucks.

In accordance with a first aspect of the present invention, a carrier puck is provided for receiving and supporting an article to be moved along a predetermined path. The article includes a first portion having a protruding ridge. The carrier puck comprises: a main body having an inner cavity for receiving at least the first portion of the article, and at least one gripper element extending from an inner side wall of the main body into the first cavity for engaging with the protruding ridge to releasably hold and stabilize the article in the puck.

The gripper element may comprise a spring-biased detent, a rounded-end screw, a fin, a helical spring, a protruding member integral with the inner side wall of the main body or other like element. The puck may include two or more gripper elements.

In accordance with a second aspect of the present invention, a carrier puck is provided for receiving and supporting one of at least first and second articles, each having different dimensions. The carrier puck comprises: a main body having a first cavity of a first size and a second cavity of a second size which differs from the first size. The first cavity is adapted to receive and support the first article and the second cavity is adapted to receive and support the second article.

The first and second cavities may intersect one another such that only one article may be received in the puck at any given time. Alternatively, the first and second cavities may be spaced from one another such that two articles may be received in the puck at the same time.

The first cavity is defined by a first inner side wall portion and a first inner base wall portion of the main body and the second cavity is defined by second inner side wall portions and second inner base wall portions of the main body. The first cavity has a first depth and the second cavity has a second depth which differs from the first depth. Preferably, the first and second depths are determined such that the upper end of each article is positioned at generally the same location relative to an exterior point on the puck.

The carrier puck may further comprise a first gripper element extending from the first side wall portion for engaging with a protruding ridge provided on the first article to releasably hold and stabilize the first article when the first article is received in the main body. The carrier puck may also include a second gripper element extending from one of the second side wall portions for engaging with a protruding ridge provided on the second article to releasably hold and stabilize the second article when the second article is received in the main body.

The main body may include a third cavity which is adapted to receive and support a third article.

In accordance with a third aspect of the present invention, a carrier puck is provided for receiving and supporting one of at least first and second articles to be moved along a predetermined path. The carrier puck comprises: a main body including a first cavity having a first center line and a second cavity having a second center line which is spaced a given distance from the first center line. The first cavity is adapted to receive and support the first article and the second cavity is adapted to receive and support the second article.

In accordance with a fourth aspect of the present invention, a transport apparatus is provided for transporting first and second articles along a predetermined path. The transport apparatus comprises: first and second carrier pucks and a conveyor for moving the first and second carrier pucks along a predetermined path. The first carrier puck comprises a first main body having a first cavity of a first size for receiving the first article. The second carrier puck comprises a second main body having a second cavity of a second size which differs from the first size. The second cavity is adapted to receive the second article.

The first cavity is defined by a first inner side wall portion and a first inner base wall portion of the first main body and the second cavity is defined by a second inner side wall portion and a second inner base wall portion of the second main body. The first inner base wall portion extends a first distance from an outer lower end of the first main body and the second base wall portion extends a second distance from an outer lower end of the second main body. The second distance is different from the first distance.

The first carrier puck may further comprise a first gripper element extending from the first side wall portion for engaging with a protruding ridge provided on the first article to releasably hold and stabilize the first article in the first main body. The second carrier puck may also comprise a second gripper element extending from the second side wall portion for engaging with a protruding ridge provided on the second article to releasably hold and stabilize the second article in the second main body.

It is an object of the present invention to provide a carrier puck for receiving and supporting an article having walls which are not generally straight. It is also an object of the present invention to provide a carrier puck which is capable of receiving and supporting one of at least first and second articles, each having different dimensions. It is another object of the present invention to provide a transport apparatus having first and second carrier pucks for transporting first and second articles, each having different dimensions, along a predetermined path. It is further an object of the present invention to provide a carrier puck for receiving and supporting an article having a protruding ridge. It is still another object of the present invention to provide a carrier puck having a first cavity of a first size and a second cavity of a second size which differs from the first size. It is still a further object of the present invention to provide a carrier puck having a first cavity having a first center line and a second cavity having a second center line which is spaced a given distance from the first center line. These and other objects and advantages of the present invention will be apparent from the following description, the accompanying drawings, and the appended claims.

DETAILED DESCRIPTION OF THE INVENTION

Figure 1:
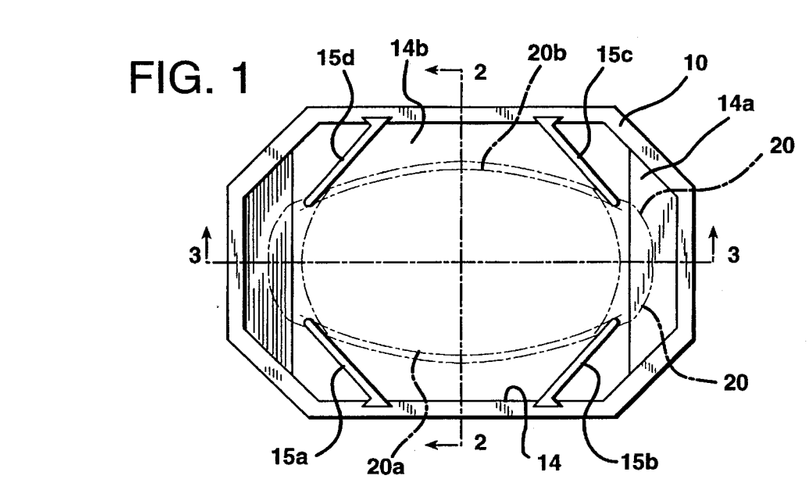
FIG. 1 is a top view of a carrier puck formed in accordance with a first embodiment of the present invention including a bottle shown in phantom.
Figure 2:
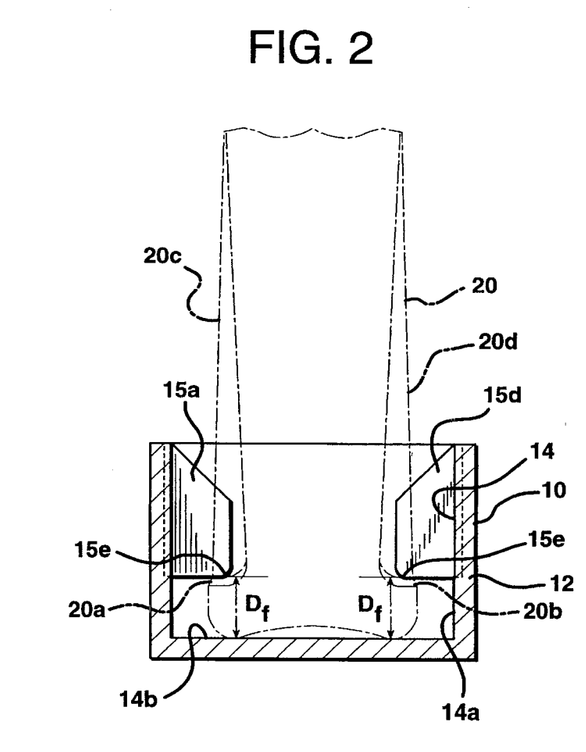
FIG. 2 is a sectional view along section line 2—2 in FIG. 1.
Figure 3:
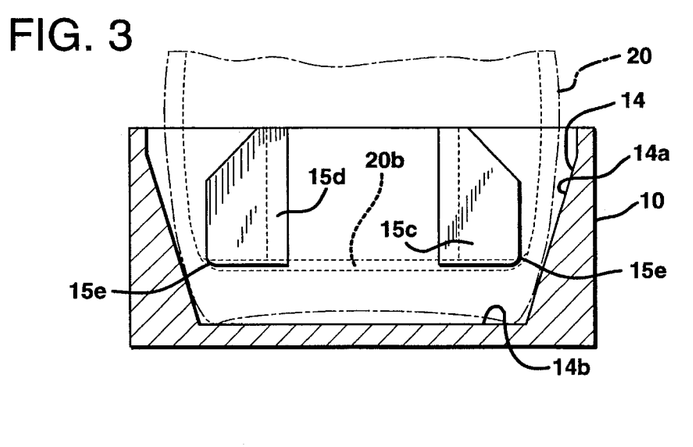
FIG. 3 is a sectional view along section line 3—3 in FIG. 1.

A carrier puck formed in accordance with the present invention is shown in FIGS. 1–3, and is generally designated by the reference numeral 10. The carrier puck 10 comprises a main body 12 which may be formed from a metal or a polymeric material such as polyurethane foam. The main body 12 includes a cavity 14 which is capable of receiving and supporting an article such as a bottle 20.

The bottle 20 includes first and second protruding ridges 20a and 20b extending respectively from opposing side walls 20c and 20d of the bottle 20. The cavity 14 is defined by an inner side wall 14a and an inner base wall 14b. Extending from the inner side wall 14a are four gripper elements comprising fins 15a–15d. Each of the fins 15a–15d is spaced a distance $D_f$ from the inner base wall 14b such that a lower edge portion 15e on each of the fins 15a–15d engages with one of the protruding ridges 20a and 20b to releasably hold and stabilize the bottle 20 within the cavity 14.

Figure 4:
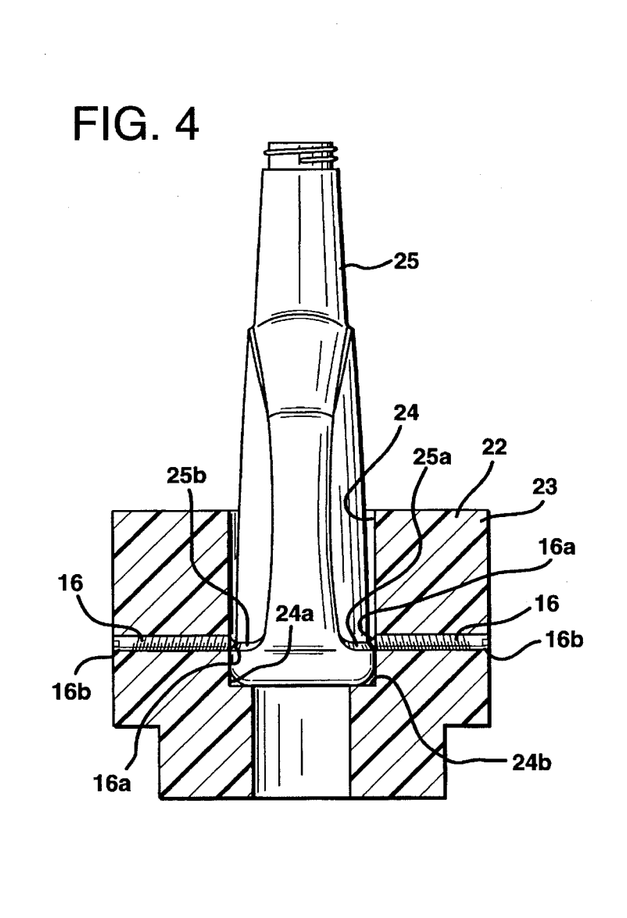
FIG. 4 is a side view, partially in section, of a carrier puck including gripper elements constructed in accordance with a second embodiment of the present invention.

In accordance with a second embodiment of the present invention, a carrier puck 22 is provided comprising a main body 23 having an inner cavity 24 for receiving a bottle 25, see FIG. 4. The inner cavity 24 is defined by an inner side wall 24a and an inner base wall 24b. Extending from the inner side wall 24a are four gripper elements, each comprising a rounded-end screw 16 (only two are shown in FIG. 4). Each screw 16 extends through the main body 23 such that its rounded end 16a engages one of two protruding ridges 25a and 25b provided on the bottle 25. The extent to which the screw 16 extends into the cavity 24 may be adjusted by turning the screw 16 via its slotted head 16b. A chamfered-end or other appropriately shaped screw (not shown) may be used in place of the rounded-end screw 16.

Figure 5:
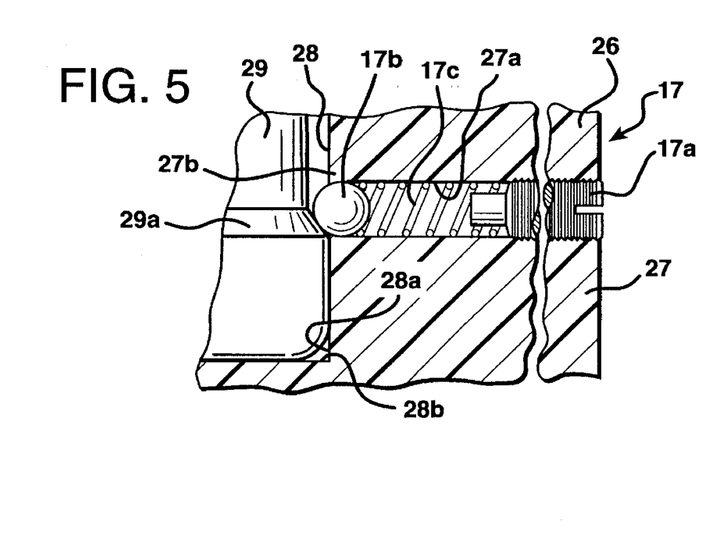
FIG. 5 is an enlarged view, partially in section, showing a gripper element constructed in accordance with a third embodiment of the present invention.

In accordance with a third embodiment of the present invention, a carrier puck 26 is provided comprising a main body 27 having an inner cavity 28 for receiving a bottle 29, see FIG. 5. The inner cavity 28 is defined by an inner side wall 28a and an inner base wall 28b. Extending from the inner side wall 28a are four gripper elements, each comprising a spring-biased ball detent 17 located within a bore 27a in the main body 27. The spring-biased ball detent 17 comprises a screw 17a, a ball 17b and a spring 17c. The spring 17c urges the ball 17b in a direction toward the inner cavity 28 such that the ball 17b engages with one of two protruding ridges 29a (Only one is shown in FIG. 5) on the bottle 29. The inner end 27b of the bore 27a has an inner diameter which is less than the outer diameter of the ball 17b so as to prevent the ball 17b from leaving the bore 27a.

A carrier puck 30 formed in accordance with a fourth embodiment of the present invention is shown in FIGS. 6–9. The carrier puck 30 comprises a main body 32 having a first cavity 34 of a first size and a second cavity 36 of a second size which differs from the first size. The first cavity 34 is defined by a first inner side wall portion 34a and a first inner base wall portion 34b. The second cavity 36 is defined by second inner side wall portions 36a and second inner base wall portions 36b. An opening 37 extends through the bottom wall 30a of the main body 32 to allow for easy bottle removal, either manually or via a reciprocating piston (not shown) or like device. The opening 37 also allows for drainage when the puck 30 is filled with a liquid such as when the puck is washed.

The first cavity 34 is capable of receiving and supporting a first bottle 40 having first dimensions and the second cavity 36 is capable of receiving and supporting a second bottle 42 having second dimensions which differ from the first dimensions. In the illustrated embodiment, the dimensions of the first bottle 40 are greater than those of the second bottle 42.

Figures 8, 9:
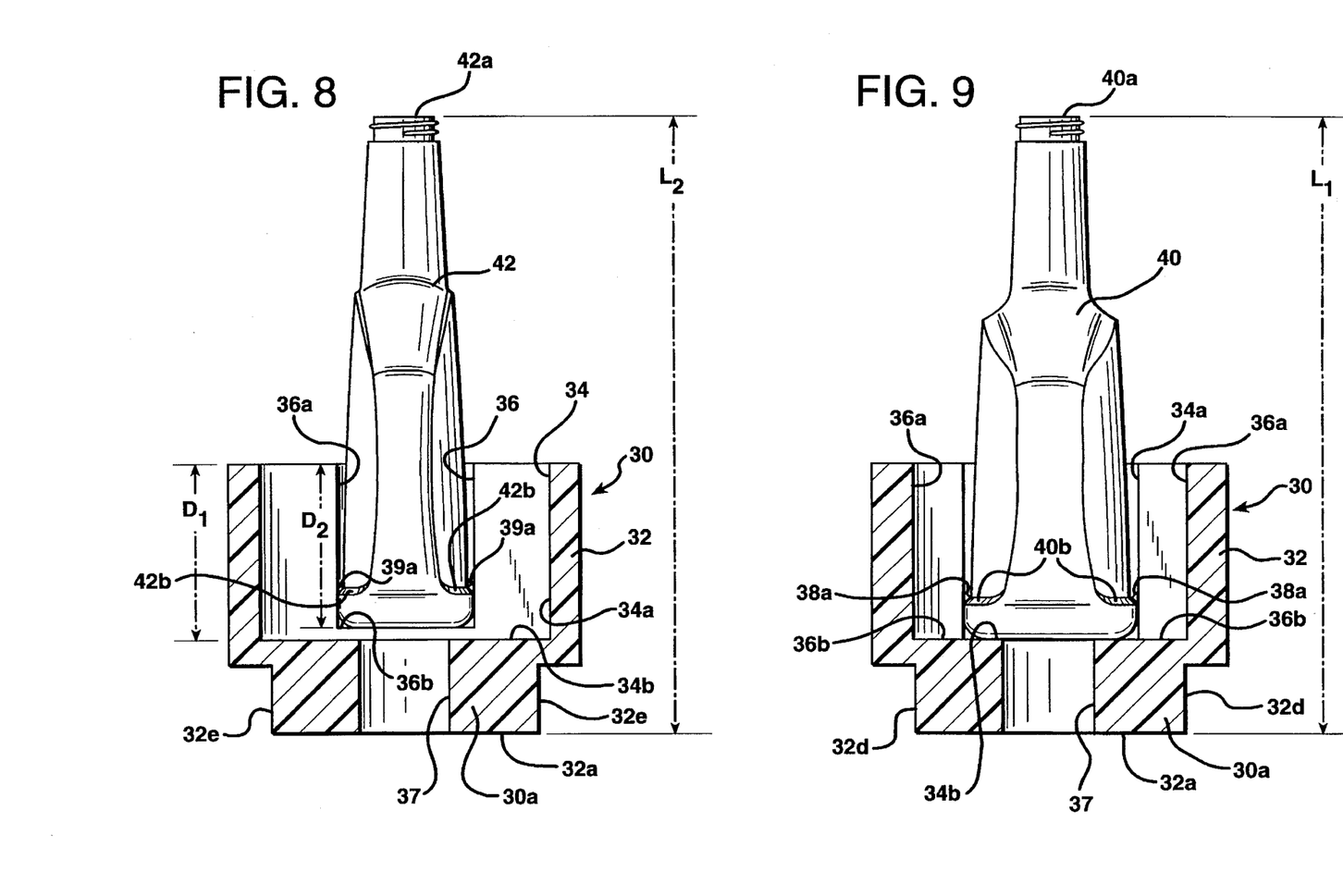
FIG. 8 is a sectional side view of the puck shown in FIG. 7.
FIG. 9 is a sectional side view of the puck shown in FIG. 7 with the puck rotated from its position shown in FIG. 8.

The first cavity 34 has a first depth $D_1$ and the second cavity 36 has a second depth $D_2$, see FIG. 8. The first inner base wall portion 34b is vertically spaced from the second inner base wall portions 36b such that the first depth $D_1$ is greater than the second depth $D_2$. The upper end 40a of the first bottle 40 is spaced a distance $L_1$ from the lower end 32a of the main body 32 and the upper end 42a of the second bottle 42 is spaced a distance $L_2$ from the lower end 32a, see FIGS. 8 and 9. Preferably, the depths $D_1$ and $D_2$ are selected such that $L_2$ is substantially equal to $L_1$. When $L_2$ is substantially equal to $L_1$, the upper ends 40a and 42a of the first and second bottles 40 and 42 are located at generally the same position relative to machinery along a processing line. This result in a reduction in processing line downtime since most or all machinery along the processing line does not have to be modified when a change is made from processing bottles 40 to bottles 42 and, vice versa.

The carrier puck 30 further includes four first gripper elements 38a which act to engage with protruding ridges 40b provided on the first bottle 40 to releasably hold and stabilize the first bottle 40 when it is received in the first cavity 34. Further provided are four second gripper elements 39a which act to engage with protruding ridges 42b provided on the second bottle 42 to releasably hold and stabilize the second bottle 42 when it is received in the second cavity 36. The number of first and second gripper elements 38a and 39a provided may be less than four or greater than four. In the embodiment illustrated in FIGS. 6–9, the first and second gripper elements 38a and 39a comprise protruding elements which are integrally formed with the inner walls 34a and 36a.

Each of the first and second gripper elements 38a and 39a may alternatively comprise a rounded-end screw (see FIG. 4), a spring-biased ball detent (see FIG. 5), a fin (see FIGS. 1–3), a helical spring (not shown) partially extending from one of the inner walls 34a and 36a, or other like element. It is also contemplated by the present invention that the puck 30 may be devoid of gripper elements.

Figure 6:
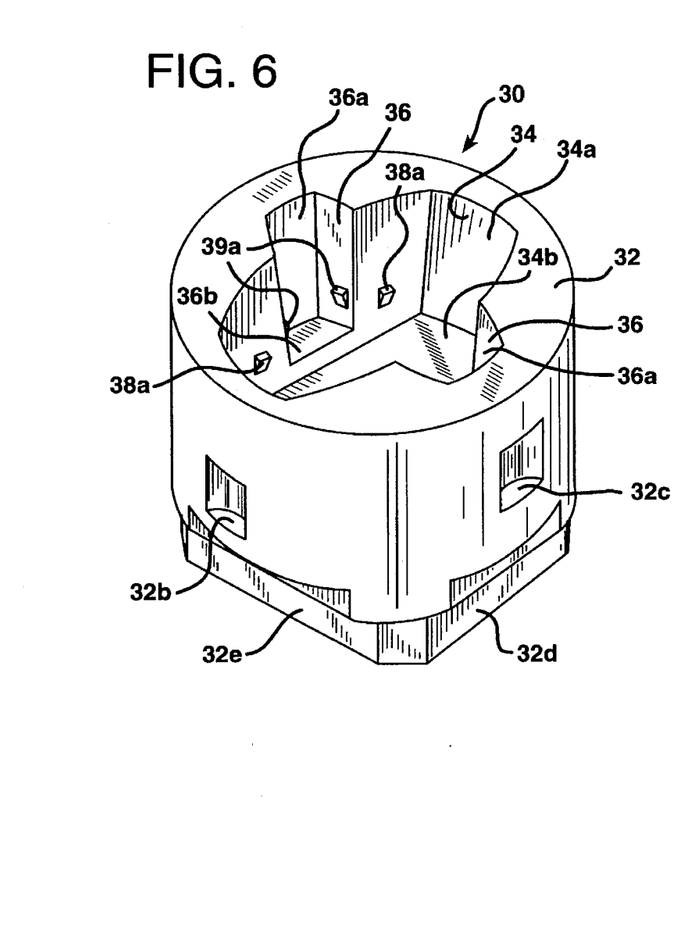
FIG. 6 is a perspective view of a carrier puck configured in accordance with a fourth embodiment of the present invention.
Figure 7:
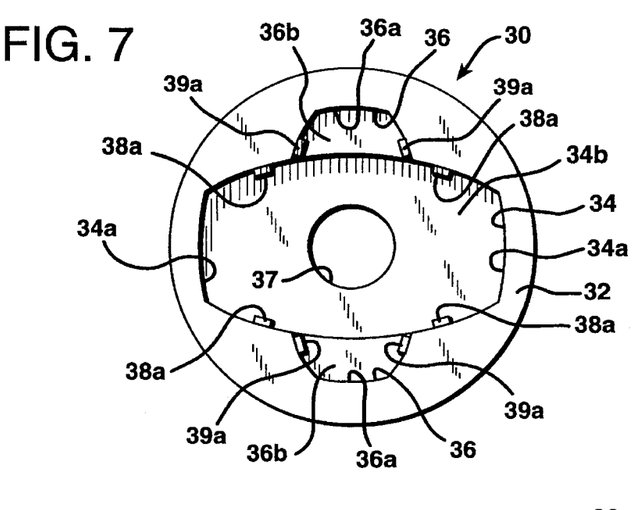
FIG. 7 is a plan view of the carrier puck shown in FIG. 6.

The main body 32 includes two outer diametrically opposed first recesses 32b (only one is shown in FIG. 6) and two outer diametrically opposed second recesses 32c (only one is shown in FIG. 6). The first recesses 32b are vertically spaced from the second recesses 32c to allow a packaging machine to sense via a roller (not shown) or like element when the puck is properly oriented to receive either a first bottle 40 or a second bottle 42. The roller is received in one of the first and second recesses 32b and 32c when the puck is properly oriented to receive either the first bottle 40 or the second bottle 42.

In the embodiment illustrated in FIGS. 6–9, the first and second cavities 34 and 36 intersect one another. It is also contemplated by the present invention that the main body 32 may include first and second cavities which do not cross one another such that the puck 30 is capable of supporting first and second bottles at the same time.

The puck 30 and, hence, one of the first and second bottles 40 and 42, is conveyed along a predetermined path, e.g., a packaging line, by a conveyor (not shown) which may comprise a belt extending between opposing guide rails (not shown). The guide rails engage with first lower side surfaces 32d or second lower side surfaces 32e to maintain the puck 30 properly positioned on the conveyor.

Figure 10:
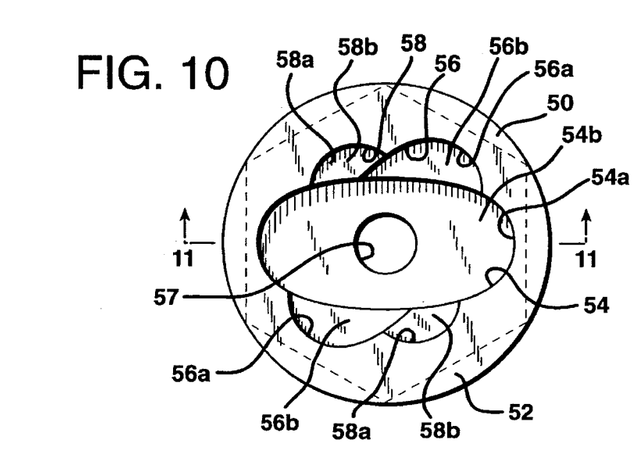
FIG. 10 is a plan view of a carrier puck formed in accordance with a fifth embodiment of the present invention.
Figure 11:
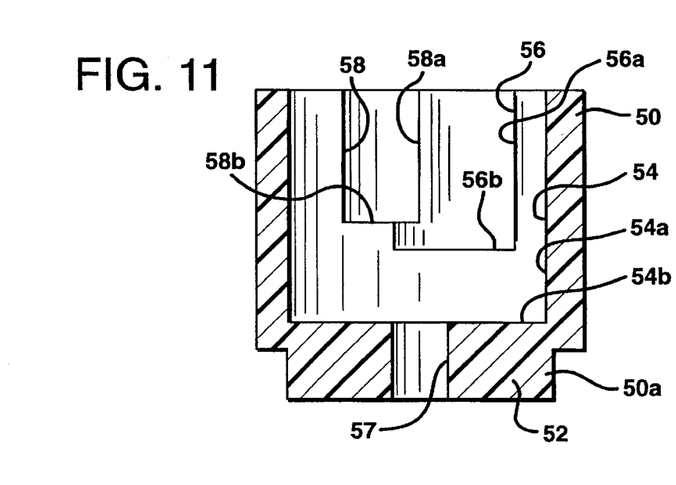
FIG. 11 is a sectional side view of the puck shown in FIG. 10.

A carrier puck 50 formed in accordance with a fifth embodiment of the present invention is shown in FIGS. 10 and 11. The carrier puck 50 comprises a main body 52 having a first cavity 54 of a first size, a second cavity 56 of a second size, and a third cavity 58 of a third size. The first cavity 54 is defined by a first inner side wall portion 54a and a first inner base wall portion 54b. The second cavity 56 is defined by second inner side wall portions 56a and second inner base wall portions 56b. The third cavity 58 is defined by second inner side wall portions 58a and second inner base wall portions 58b. An opening 57 extends through the bottom wall 50a of the main body 52 to allow for liquid drainage and for easy bottle removal, either manually or via a reciprocating piston (not shown) or like device.

The first cavity 54 is capable of receiving and supporting a first bottle (not shown) having first dimensions. The second cavity 56 is capable of receiving and supporting a second bottle (not shown) having second dimensions which are less than the first dimensions. The third cavity 58 is capable of receiving and supporting a third bottle (not shown) having third dimensions which are less than the first and second dimensions. While the carrier puck 50 is not shown having gripper elements, gripper elements such as spring-biased ball detents, rounded-end screws, fins, helical springs, protruding members integral with inner side wall portions or other like elements may be provided.

Figure 12:
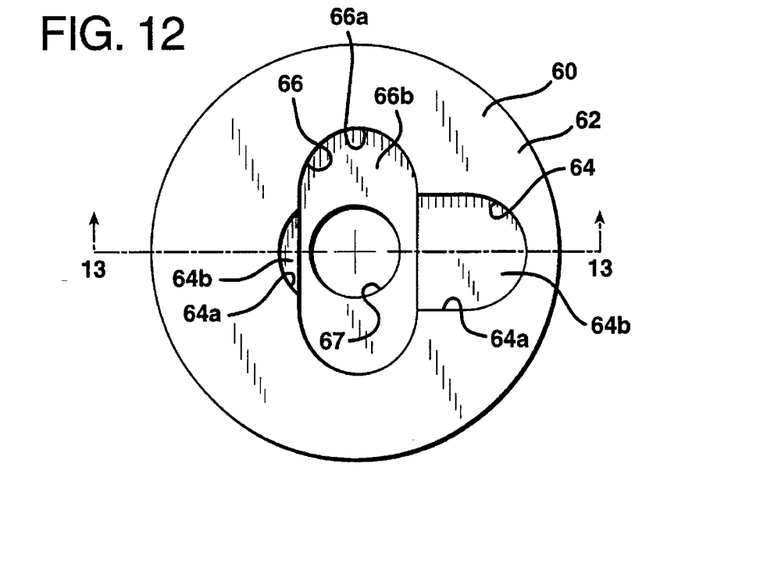
FIG. 12 is a plan view of a carrier puck formed in accordance with a sixth embodiment of the present invention.
Figure 13:
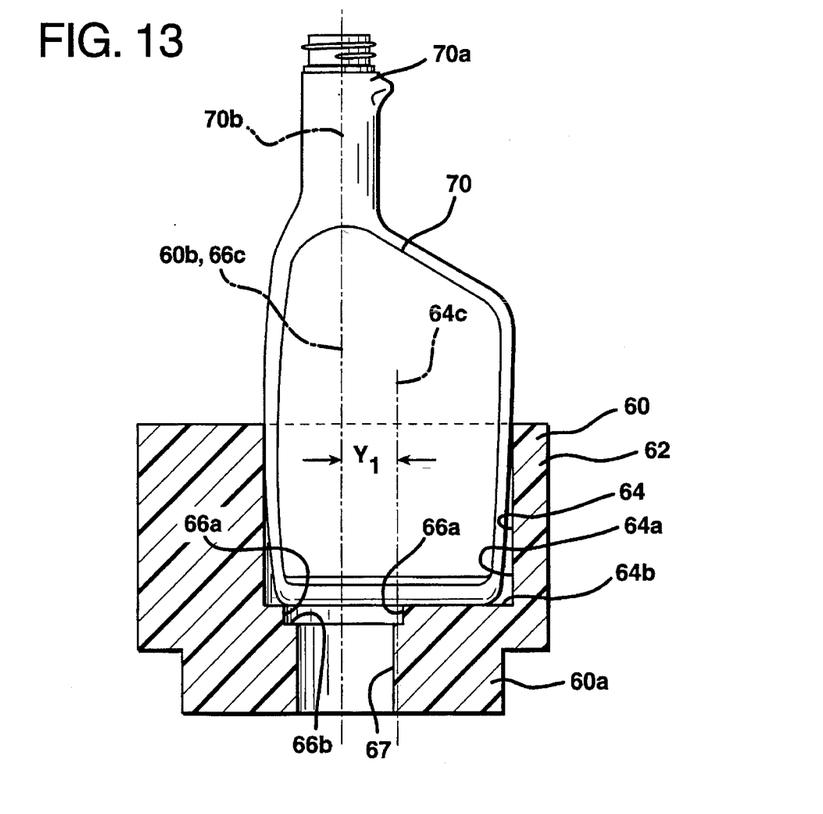
FIG. 13 is a sectional side view of the puck shown in FIG. 12.

A carrier puck 60 formed in accordance with a sixth embodiment of the present invention is shown in FIGS. 12 and 13. The carrier puck 60 comprises a main body 62 having first and second cavities 64 and 66, respectively. The first cavity 64 is defined by first inner side wall portions 64a and first inner base wall portions 64b. The first cavity 64 has a center line 64c which is spaced a distance $Y_1$ from a center line 60b of the main body 60, see FIG. 13. The second cavity 66 is defined by a second inner side wall portion 66a and a second inner base wall portion 66b. The center line 66c of the second cavity 66 is essentially collinear with the center line 60b. An opening 67 extends through the bottom wall 60a of the main body 62 to allow for liquid drainage and for easy bottle removal, either manually or via a reciprocating piston (not shown) or like device.

The first cavity 64 is capable of receiving and supporting a first bottle 70 having an off-center upper end portion 70a. The second cavity 66 is capable of receiving and supporting a second bottle (not shown). The distance $Y_1$ between the center lines 64c and 60b is determined so that a line 70b extending centrally through the upper end portion 70a of the first bottle 70 is generally collinear with the center line 60b of the main body 60.

While the carrier puck 60 is not shown having gripper elements, one or more gripper elements may be provided. The gripper elements may comprise any one of the gripper elements described above.

Figure 14:
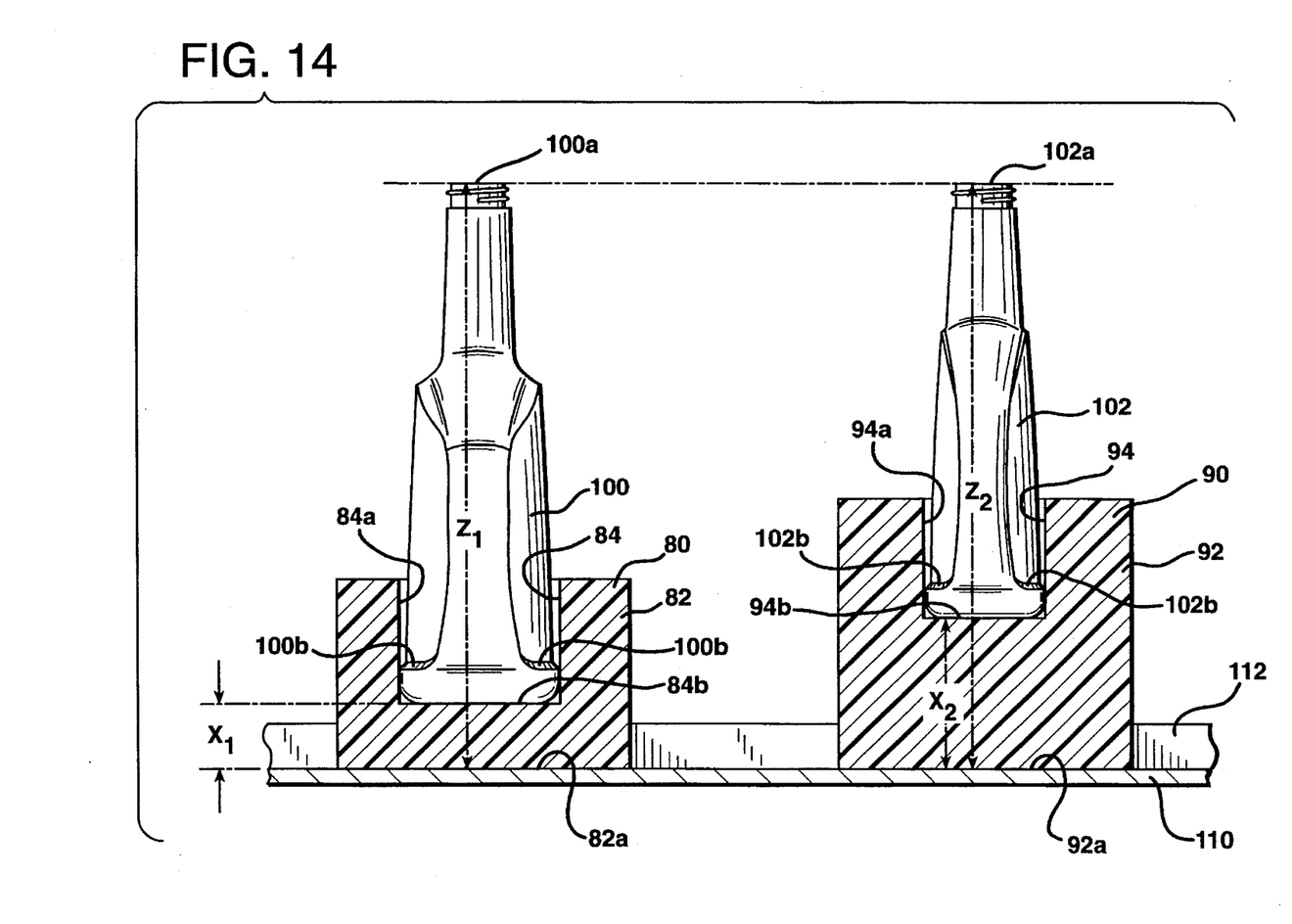
FIG. 14 is a sectional side view of first and second carrier pucks formed in accordance with a seventh embodiment of the present invention.

First and second carrier pucks 80 and 90 formed in accordance with a seventh embodiment of the present invention are shown in FIG. 14. The first carrier puck 80 comprises a first main body 82 having a first cavity 84 of a first size for receiving a first bottle 100. The second carrier puck 90 comprises a second main body 92 having a second cavity 94 of a second size for receiving a second bottle 102. The first bottle 100 has first dimensions and the second bottle 102 has second dimensions which are different from the first dimensions.

The first cavity 84 is defined by a first inner side wall portion 84a and a first inner base wall portion 84b of the first main body 82. The second cavity 94 is defined by a second inner side wall portion 94a and a second inner base wall portion 94b of the second main body 92. The first inner base wall portion 84b extends a first distance $X_1$ from an outer lower end 82a of the first main body 82. The second base wall portion 94b extends a second distance $X_2$ from an outer lower end 92a of the second main body 92. The upper end 100a of the first bottle 100 is spaced a distance $Z_2$ from the outer lower end 82a of the first main body 92 and the upper end 102a of the second bottle 102 is spaced a distance $Z_2$ from the outer lower end 92a of the second main body 92. The second distance $X_2$ is greater than the first distance $X_1$ such that the upper end 102a of the second bottle 102 is at substantially the same height as the upper end 100a of the first bottle 100.

The first carrier puck 80 may include first gripper elements (not shown) extending from the first side wall portion 84a for engaging with protruding ridges 100b provided on the first bottle 100 to releasably hold and stabilize the first bottle 100 in the first main body 82. The second carrier puck 90 may further comprise second gripper elements (not shown) extending from the second side wall portion 94a for engaging with protruding ridges 102b provided on the second bottle 102 to releasably hold and stabilize the second bottle 102 in the second main body 92. The first and second gripper elements may comprise spring-biased ball detents, rounded-end screws, fins, helical springs, protruding members integral with inner side wall portions or the like.

The first and second pucks 80 and 90 are moved along a predetermined path via a conveyor, such as a belt 110. Positioned on opposite sides of the belt 110 are guide rails 112 (only one is shown in FIG. 14) for maintaining the first and second pucks 80 and 90 correctly positioned on the belt 110.

Having described the invention in detail and by reference to preferred embodiments thereof, it will be apparent that modifications and variations are possible without departing from the scope of the invention defined in the appended claims. For example, it is contemplated by the present invention that puck 60 shown in FIGS. 12 and 13 may include only recess 64.

What is claimed is:

1. A carrier puck for receiving and supporting one of at least first and second articles, said first article having first dimensions and said second article having second dimensions which differ from said first dimensions, said carrier puck comprising:

a main body having a first cavity of a first size and a second cavity of a second size which differs from said first size, said first cavity being adapted to receive and support said first article and said second cavity being adapted to receive and support said second article and wherein said first and second cavities intersect one another.

2. A carrier puck as set forth in claim 1, wherein said first cavity has a first depth and said second cavity has a second depth which differs from said first depth such that an upper end on said first article is maintained at substantially the same height as an upper end on said second article.

3. A carrier puck as set forth in claim 1, wherein said first article has an off-center upper end portion and said first cavity has a center line which is spaced a given distance from a center line of said main body such that a line extending centrally through said upper end portion of said first article is generally collinear with said center line of said main body.

4. A carrier puck as set forth in claim 1, wherein said first cavity is defined by a first inner side wall portion and a first inner base wall portion of said main body and said second cavity is defined by second inner side wall portions and second inner base wall portions of said main body, said second base wall portions being vertically spaced from said first base wall portion.

5. A carrier puck as set forth in claim 4, further comprising a first gripper element extending from said first side wall portion for engaging with a protruding ridge provided on said first article to releasably hold and stabilize said first article when said first article is received in said main body.

6. A carrier puck as set forth in claim 5, further comprising a second gripper element extending from one of said second side wall portions for engaging with a protruding ridge provided on said second article to releasably hold and stabilize said second article when said second article is received in said main body.

7. A carrier puck as set forth in claim 6, wherein each of said first and second gripper elements comprises a spring-biased detent.

8. A carrier puck as set forth in claim 6, wherein said first gripper element comprises a protruding member integral with said first side wall portion and said second gripper element comprises a protruding member integral with said one second side wall portion.

9. A carrier puck as set forth in claim 1, wherein said main body further comprises a third cavity which is adapted to receive and support a third article.

10. A carrier puck for receiving and supporting one of at least first and second articles to be moved along a predetermined path, said carrier puck comprising:

a main body having a first cavity having a first center line and a second cavity having a second center line which is spaced a given distance from said first center line, said first cavity being adapted to receive and support said first article and said second cavity being adapted to receive and support said second article and wherein a portion of said first cavity overlaps with a portion of said second cavity.

11. A carrier puck for receiving and supporting one of at least first and second articles, said first article having first dimensions and said second article having second dimensions which differ from said first dimensions, said carrier puck comprising:

a main body having a first cavity of a first size and a second cavity of a second size which differs from said first size, said first cavity being adapted to receive and support said first article and said second cavity being adapted to receive and support said second article and wherein a portion of said first cavity overlaps with a portion of said second cavity.

* * * * *